(12) United States Patent
Chen

(10) Patent No.: US 6,712,533 B2
(45) Date of Patent: Mar. 30, 2004

(54) HAND-HELD COMPUTER KEYBOARD

(76) Inventor: Te-Chuan Chen, No. 203, Sec. 1, Cheng Tai Road, Wu Ku Hsiang, Taipei Hsien (TW)

( * ) Notice: Subject to any disclaimer, the term of this patent is extended or adjusted under 35 U.S.C. 154(b) by 0 days.

(21) Appl. No.: 10/339,391

(22) Filed: Jan. 10, 2003

(65) Prior Publication Data

US 2003/0103791 A1 Jun. 5, 2003

Related U.S. Application Data

(63) Continuation-in-part of application No. 09/694,332, filed on Oct. 24, 2000, now abandoned.

(51) Int. Cl.[7] .................................................. B41J 5/16
(52) U.S. Cl. ...................................... 400/472; 400/489
(58) Field of Search ................................ 400/489, 488, 400/486, 485, 472, 691, 693; 361/680; 248/918, 118.1, 118.5, 118.3; 341/21, 22; 364/709.12; 235/146, 145 R (56) References Cited

U.S. PATENT DOCUMENTS

| | | | | |
|---|---|---|---|---|
| 4,378,553 A | * | 3/1983 | McCall ........................ 341/21 |
| 5,067,834 A | * | 11/1991 | Szmanda et al. ............ 400/489 |
| 5,271,593 A | * | 12/1993 | Kinner et al. ............. 248/442.2 |
| 5,350,146 A | * | 9/1994 | Chiang .................. 248/231.61 |
| 5,393,150 A | * | 2/1995 | Fort ........................... 400/489 |
| 5,466,078 A | * | 11/1995 | Szmanda et al. ............ 400/489 |
| 5,661,605 A | * | 8/1997 | Conway ..................... 361/680 |
| 5,818,357 A | * | 10/1998 | Motoyama et al. ........... 341/20 |
| 6,076,785 A | * | 6/2000 | Oddsen, Jr. ............... 248/118.3 |
| 6,357,703 B1 | * | 3/2002 | DiOrio ....................... 248/118 |

* cited by examiner

*Primary Examiner*—Anthony H. Nguyen
(74) *Attorney, Agent, or Firm*—Rosenberg, Klein & Lee (57) ABSTRACT

This invention relates to a hand-held computer keyboard, which is composed of two separate keyboards. On each keyboard, there is a stage and a clamping apparatus for fixing the keyboard on any suitable surface. On the stage, there is a stick-like handle having five plats, allowing a user to click different buttons to key in specific functions. The hand-held computer keyboard can help users to utilize their thumbs and the other four fingers more efficiently, and it is space efficient in comparison to a traditional keyboard.

1 Claim, 9 Drawing Sheets

|  | First Finger | First Finger | Middle Finger | Ring Finger | Little Finger |
|---|---|---|---|---|---|
|  | Print | Lock | Pause |  | Fn |
|  | + | 7 Home | 8 ↑ | 9 PgUp | \ |
|  | - | 4 ↓ | 5 | 6 → | [ |
|  | * | 1 end | 2 → | 3 PgDn | ] |
|  | ÷ | = | 0 Ins | . Del | / |

(1431)(1432)(1441)(1442)(1443)
(2431)(2432)(2441)(2442)(2443)

First Finger Operating Area

Middle, Ring and little Finger Operating Area

Thumb
{
Pressing the Function Keys (1423)(2423)
Without pressing the Upper and Lower Function Keys
Pressing the Upper Function Key (1421)(2421)
Pressing the Lower Function Key (1422)(2422)
Pressing the Upper and Lower Function Keys at the same time (1421.1422)(2421.2422)
}

HAND-HELD COMPUTER KEYBOARD

REFERENCE TO RELATED APPLICATIONS

This is a Continuation-in-Part of U.S. Application Ser. No. 09/694,332, filed on Oct. 24, 2000 which is now abandoned.

BACKGROUND OF THE INVENTION

The present invention is directed to an easy, convenient and space-saving hand-held computer keyboard.

People are born with highly dextrous hands, and the dexterity comes from keen fingers. Among the fingers, the most useful are the thumbs and the first fingers, especially when used together. Owing to the improvement of processors and memory, the function of computer is progressing rapidly at present. However, it is not sufficient for users to input data with the traditional keyboard because of its unfriendly ergonomics. The traditional computer keyboard, which is similar to the typewriter keyboard, makes the thumb useless and takes up more tabletop space than a hand-held computer keyboard.

SUMMARY OF THE INVENTION

The purpose of this invention is to provide a hand-held computer keyboard, which is composed of two separated keyboards. On each keyboard, there is a display light and a clamping apparatus to fix the keyboard to a suitable surface. On the stage, there is a stick-like handle with five regions where you can click different buttons to key in specific functions. Above all, the invention of the hand-held computer keyboard can help users to utilize their thumbs and the other four fingers more efficiently, and it can avoid taking up a lot of space on a tabletop, compared with the traditional keyboard.

BRIEF DESCRIPTION OF THE DRAWINGS

The present invention will be better understood by referring to the accompanying Drawings, wherein.

DETAILED DESCRIPTION OF THE PREFERRED EMBODIMENT

Figure 1:
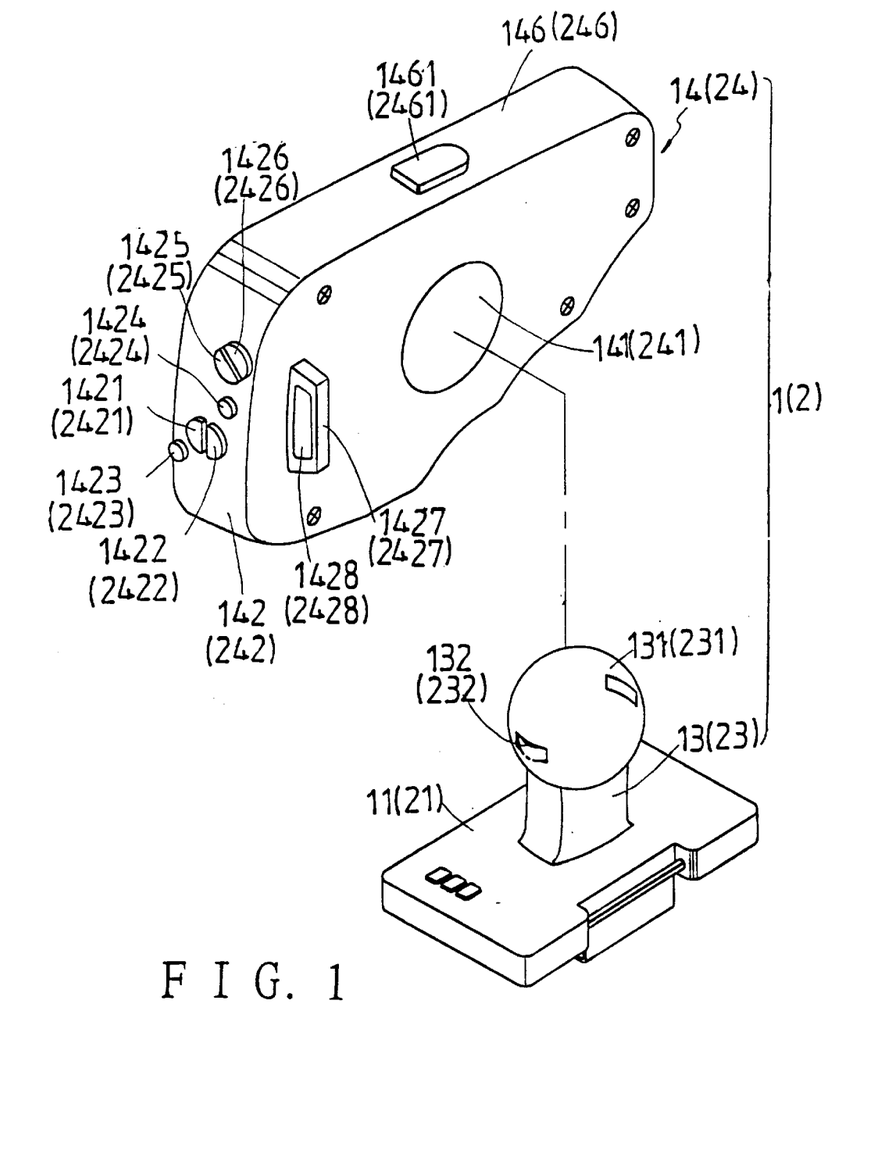
FIG. 1 is a perspective exploded view of a hand-held computer keyboard of the present invention.
Figure 2:
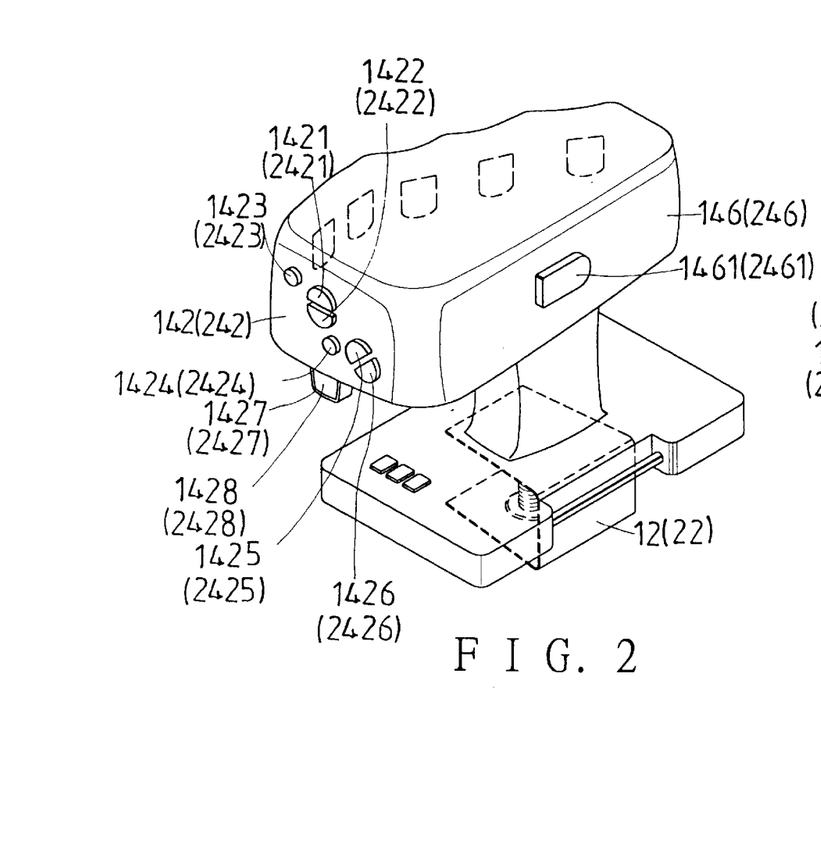
FIG. 2 is a front view of the hand-held computer keyboard of the present invention.
Figure 3:
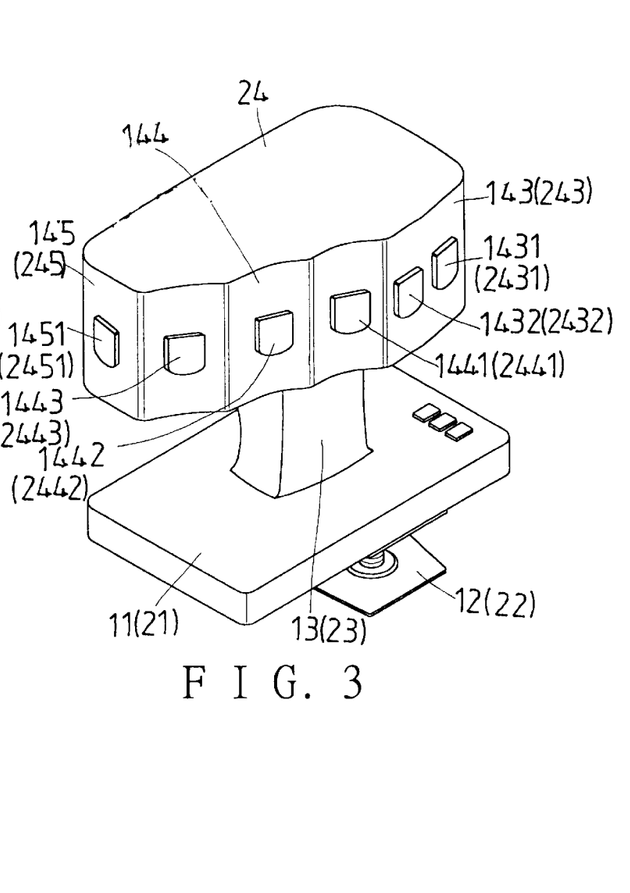
FIG. 3 is a rear view of the hand-held computer keyboard of the present invention.
Figure 4:
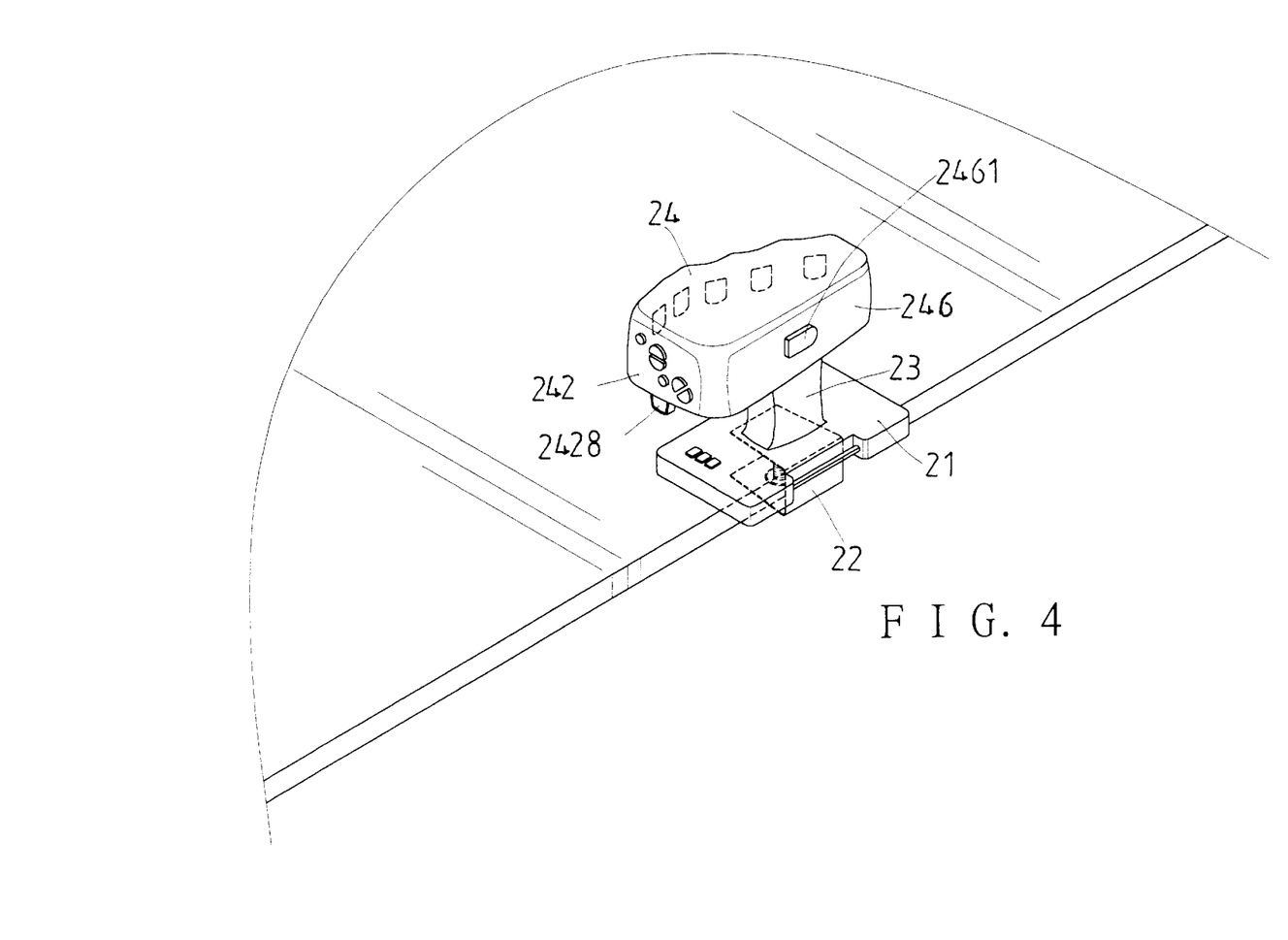
FIG. 4 is a diagram of the hand-held computer keyboard laying on the edge of a table.
Figure 5:
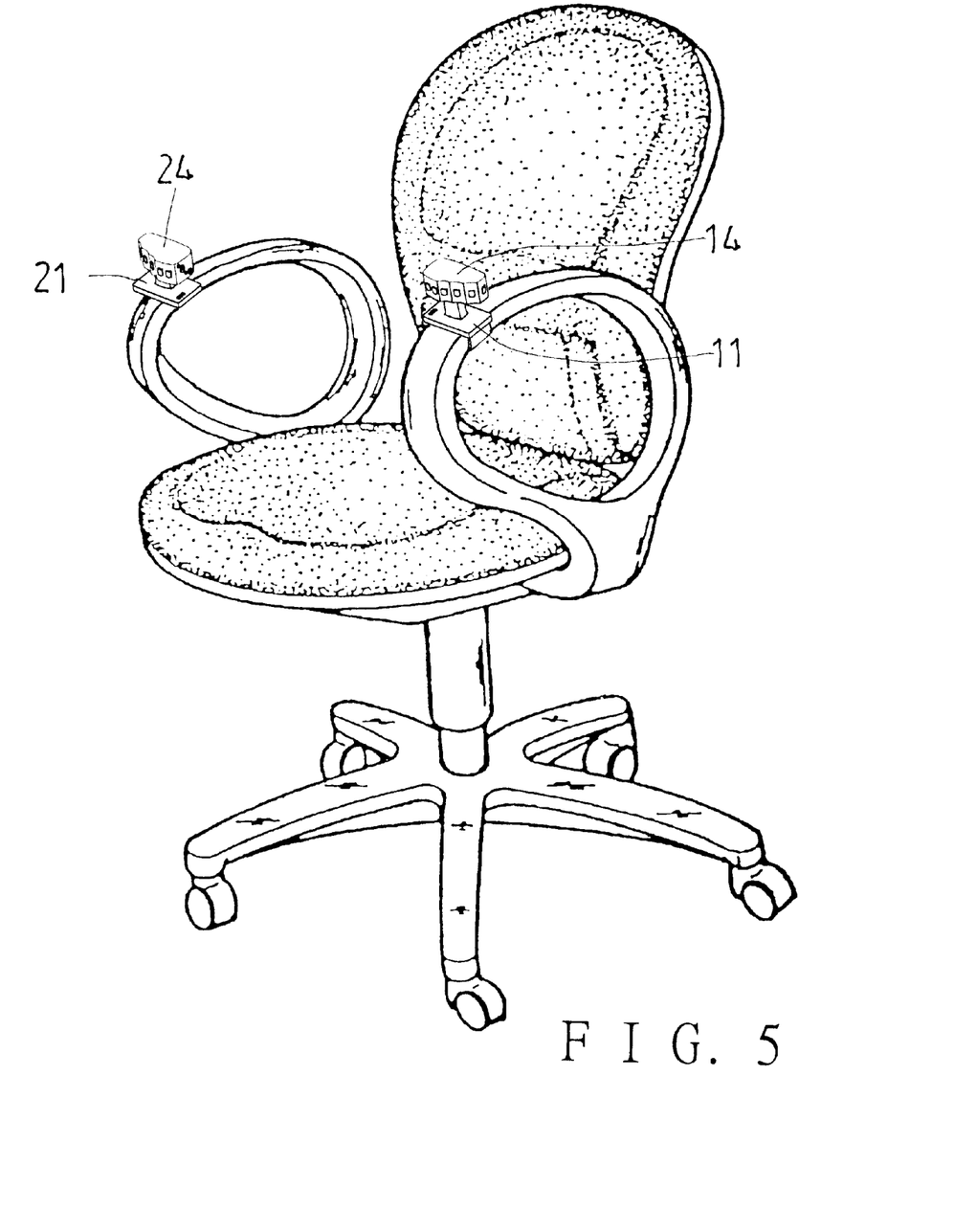
FIG. 5 is a diagram of the hand-held computer keyboard laying on the armrest of a chair.

A preferred embodiment of the hand-held computer keyboard of the present invention, shown in FIG. 1 and FIG. 2, is composed of a Left Stick-like Handle (1) and a Right Stick-Like Handle (2).

On the Left Handle (1), there is a Clamping Apparatus (12) and a Handle (13), positioned below and above the Stage (11) of the Left Stick-Like Handle (1), respectively. On the top of Handle (13), there are two corresponding Carts (132), positioned on Sphere (131), and protruding to grip the Hollow (141) of the Hand-Held Location (14) in the present invention. Further, on the sides of the Hand-Held Location (14), there are five plats where the user can click different buttons to key in specific functions. The five plats are divided into the Thumb Operating Area (142), the First Fingers Operating Area (143), Middle, Ring and Little Finger Operating Area (144), Little Finger Operating Area (145), and Palm Operating Area (146). On the Thumb Operating Area (142), there are two opposite semicircle Choosing Keys (1421), (1422), a circle Function Key (1423) and a circle Shift Key (1414), positioned above and below the two opposite semicircle Choosing Keys (1421), (1422), respectively. On the side of the Shift Key (1424), there are an opposite semicircle Ctrl Key (1425) and an opposite semicircle Alt Key (1426), allowing the thumb to press both (1425), (1426) easily. Furthermore, the Protruding Area (1427), which is below the Thumb Operating Area (142), is equipped with a large-area Enter Key (1428) to make operation easy.

On the First Finger Operating Area (143), there are two Character Keys (1431), (1432). Like the First Finger Operating Area (143), the Middle, Ring and Little Finger Operating Area (144) has its own Character Keys (1441), (1442), (1443) for middle, ring and little fingers, respectively. On the Little Finger Operating Area (145), there is an Esc Key (1451), and on the Palm Operating Area (145), there is a Space Key (1461).

There is a Clamping Apparatus (22) and a Handle (23) positioned below and above the Stage (21) of the Right Stick-like Handle (2), respectively. On the top of Handle (23), there are two corresponding Carts (232), which are located on Sphere (231), and protrude to grip the Hollow (241) of the Hand-Held Location (24) of the present invention. In addition, on the sides of the Hand-Held Location (24), there are five plats where one can click different buttons to key in specific functions. The five plats are divided into the Thumb Operating Area (242), the First Fingers Operating Area (243), Middle, Ring and Little Finger Operating Area (244), Little Finger Operating Area (245), and Palm Operating Area (246). On the Thumb Operating Area (242), there are two opposite semicircle Choosing Keys (2421), (2422). A circle Function Key (2423) and a circle Shift Key (2424) are positioned above and below the two opposite semicircle Choosing Keys (2421), (2422), respectively. On the side of the Shift Key (2424), there are an opposite semicircle Ctrl Key (2425) and an opposite semicircle Alt Key (2426), allowing the thumb to press both of them (2425), (2426) easily. Furthermore, the Protruding Area (2427), which is below the Thumb Operating Area (242), is equipped with a large-area Enter Key (2428) to make operation easy.

On the First Finger Operating Area (243), there are two Character Keys (2431), (2432). Like the First Finger Operating Area (243), the Middle, Ring and Little Finger Operating Area (244) has its own Character Keys (2441), (2442), (2443) for the middle, ring and little fingers to operate, respectively. On the Little Finger Operating Area (245), there is an Esc Key (2451), and on the Palm Operating Area (245), there is a Space Key (2461).

Figure 6:
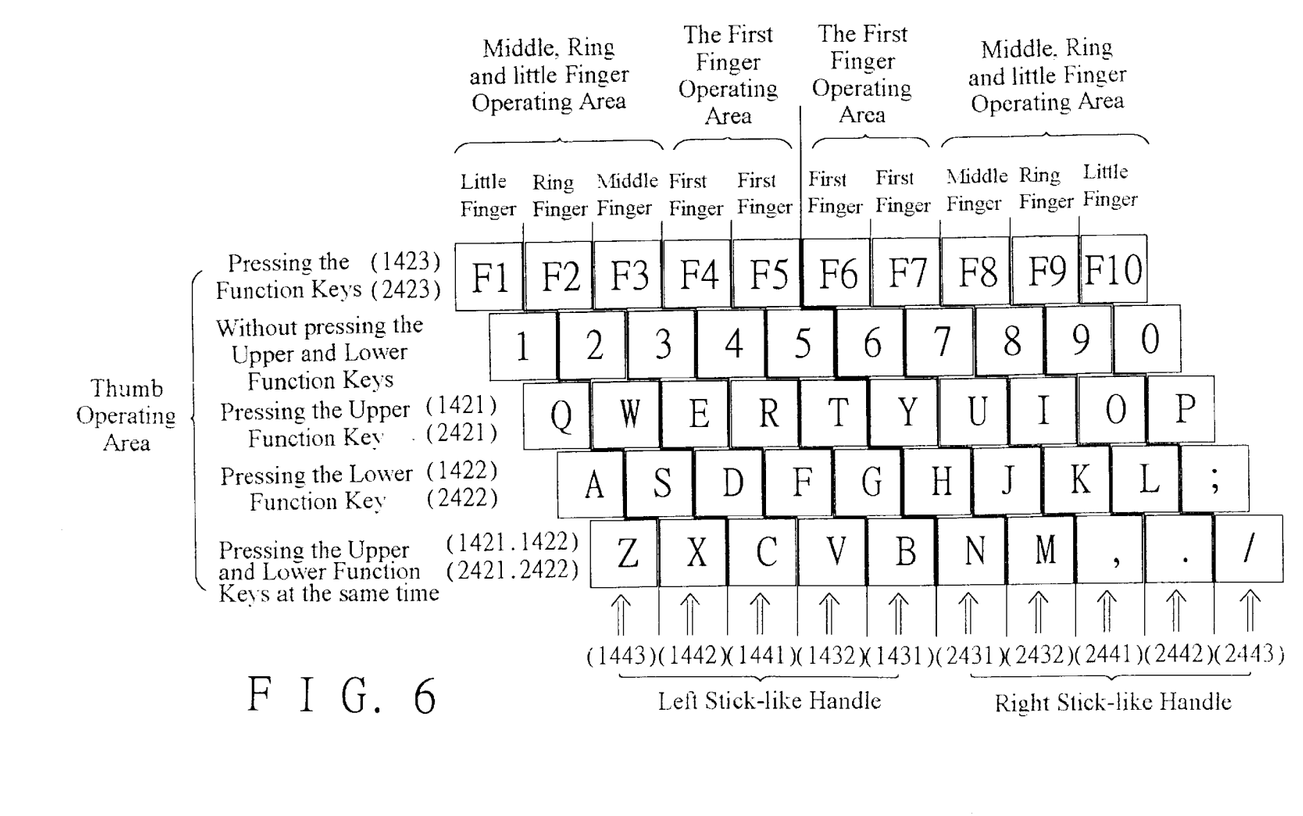
FIG. 6 is a correspondence table of each key of the hand-held computer keyboard.
Figure 7:
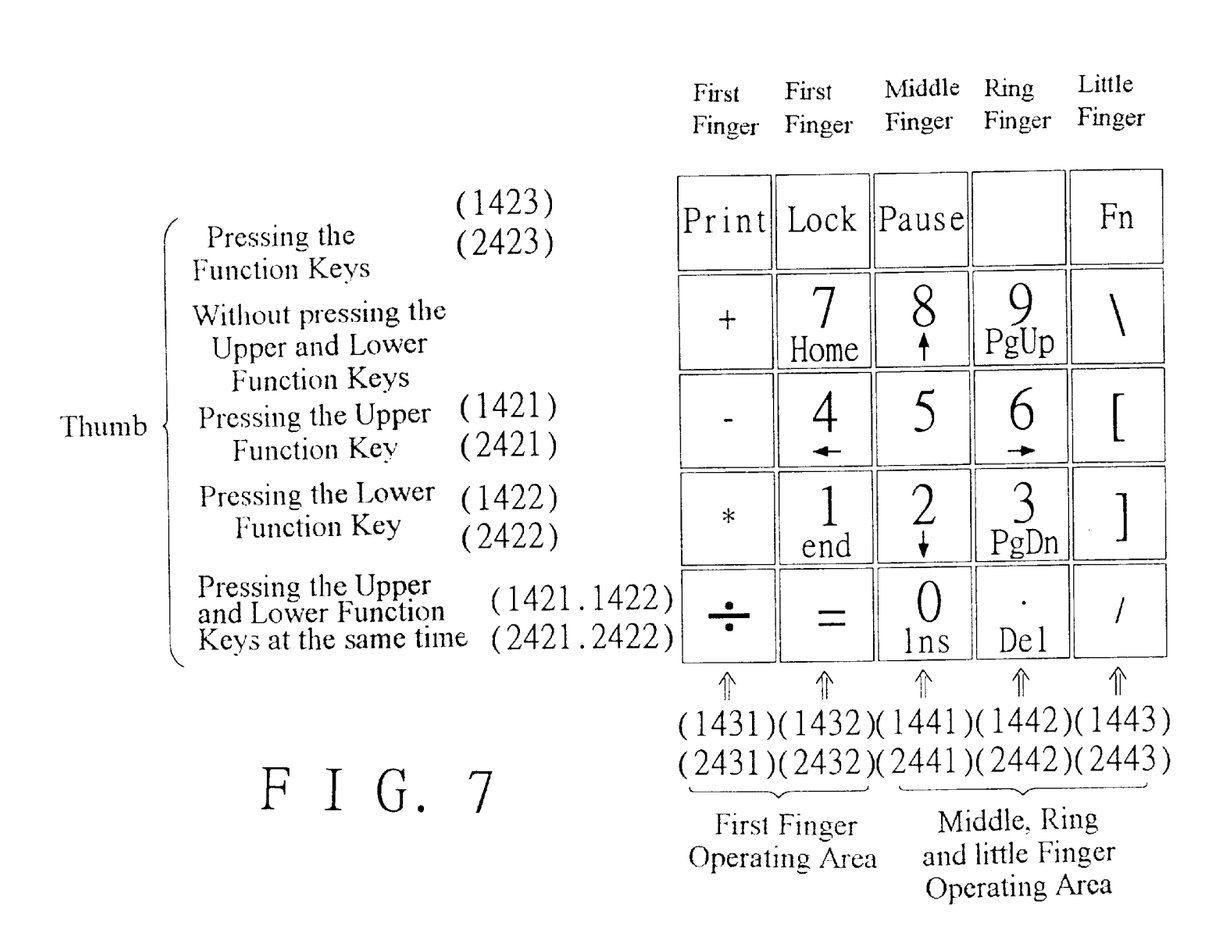
FIG. 7 shows the relative position of each numeral key set/function key set of the hand-held computer keyboard.
Figure 11:
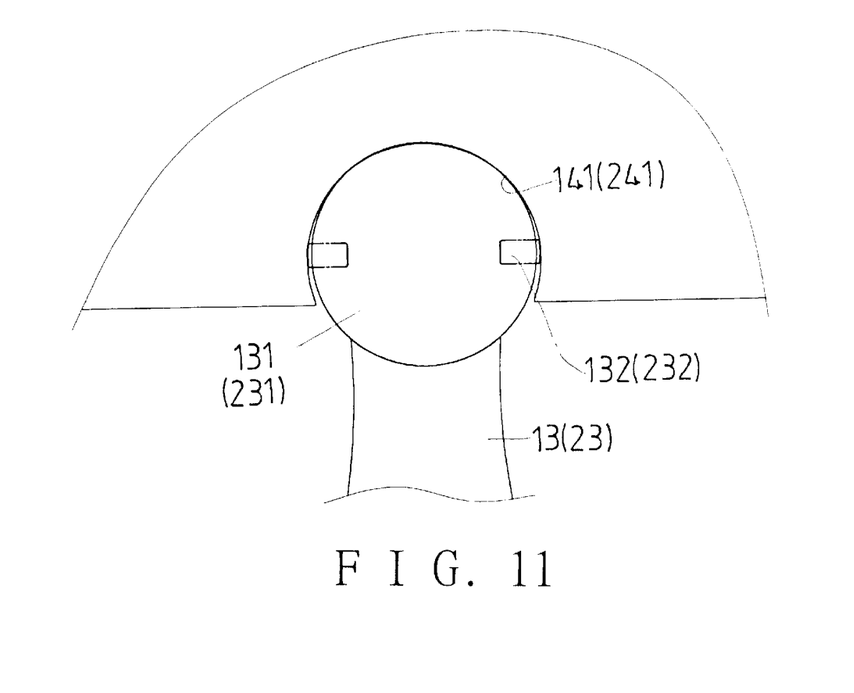
FIG. 11 is a diagram of the cart, which protrudes to grip the hollow of the hand-held location; and, FIG. 12 is a diagram of the cart, which is drawn back to prevent gripping the hollow of the hand-held location.

Basically, the hand-held computer keyboard is divided into two parts: Right and Left Stick-like Handles (as shown in FIG. 6). The hand-held computer keyboard of the present invention is operated in a similar manner to the traditional keyboard. FIG. 7 illustrates the layout of the function keys (e.g., Insert, Home, Page Up, Delete, End, Page Down, ↑, ←, ↓, →, etc.) on the hand-held computer keyboard. When the computer is turned on, there are two corresponding Carts (132), (232) on the Spheres (131), (231) protruding to grip the Hollows (141), (241) of the Hand-Held Positions (14), (24) (as shown in FIG. 11). Therefore, the Left, Right Stick-like Handles (1), (2) and Hand-Held Positions (14), (24) are fixed. When users would like to operate the Left, Right Stick-like Handles (1), (2) as a mouse, they can press any two of the Character Keys (1441), (1442), (1443), (2441), (2442), (2443) on the Middle, Ring and Little Finger Operating Areas (144), (244). Further, the operation stops the two Carts (132), (232) from protruding to grip the Hollows (141), (241) of the Hand-Held Positions (14), (24), allowing the Hand-Held Positions (14), (24) to move freely to the front, back, right and left sides.

Pivotal movement of Hand-Held Location (14) or (24) about Sphere (131) or (231) generates positioning signals to the associated computer. In other words, movement of the Hand-Held Locations (14), (24) generates cursor control or mouse-like movement signals for controlling a cursor or pointer associated with the computer programming.

Figure 8:
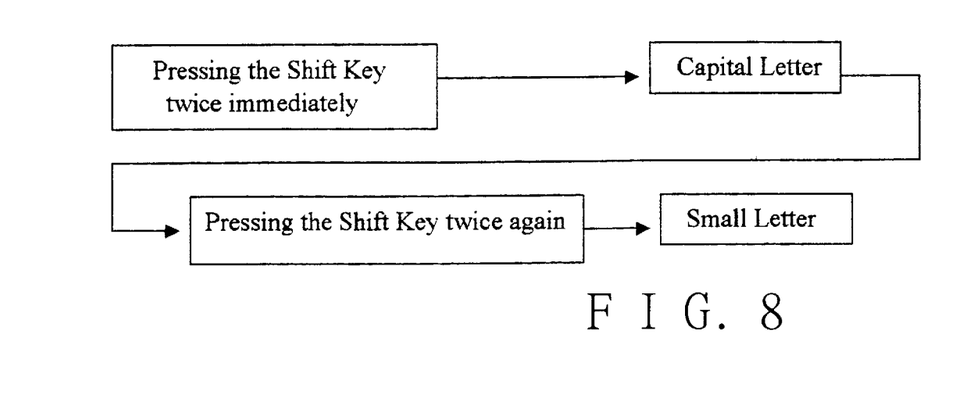
FIG. 8 is a flow chart illustrating switching the capital letter/lowercase letter of the hand-held computer keyboard.

Operation of the hand-held computer keyboard is summarized as follows:

1. There are two options to switch a small letter to a capital letter. First, users can press the Shift Keys (1424), (2424) and the Character Key at the same time to key in a capital letter, or without pressing the Shift Keys (1424), (2424) to key in a small letter. Second, users can double-click the Shift Keys (1424), (2424) to achieve the same function, and this is similar to pressing down the Caps Lock key of the traditional keyboard. Then, the user presses the Shift Keys (1424), (2424) again if the user wants to retrieve the small letter (as shown in FIG. 8).

2. The letters operated with each finger (as shown in FIG. 6):

|  | Left Hand | Right Hand |
| --- | --- | --- |
| The First Finger | F4, F5, 4, 5, R, T, F, G, V, G | F6, F7, 6, 7, Y, U, H, J, N, M |
| Middle Finger | F3, 3, E, D, C | F8, 8, I, K,' |
| Ring Finger | F2, 2, W, S, X | F9, 9, O, L |
| Little Finger | F1, 1, Q, A, Z | F10, O, P, ;, ', / |

Figure 9:
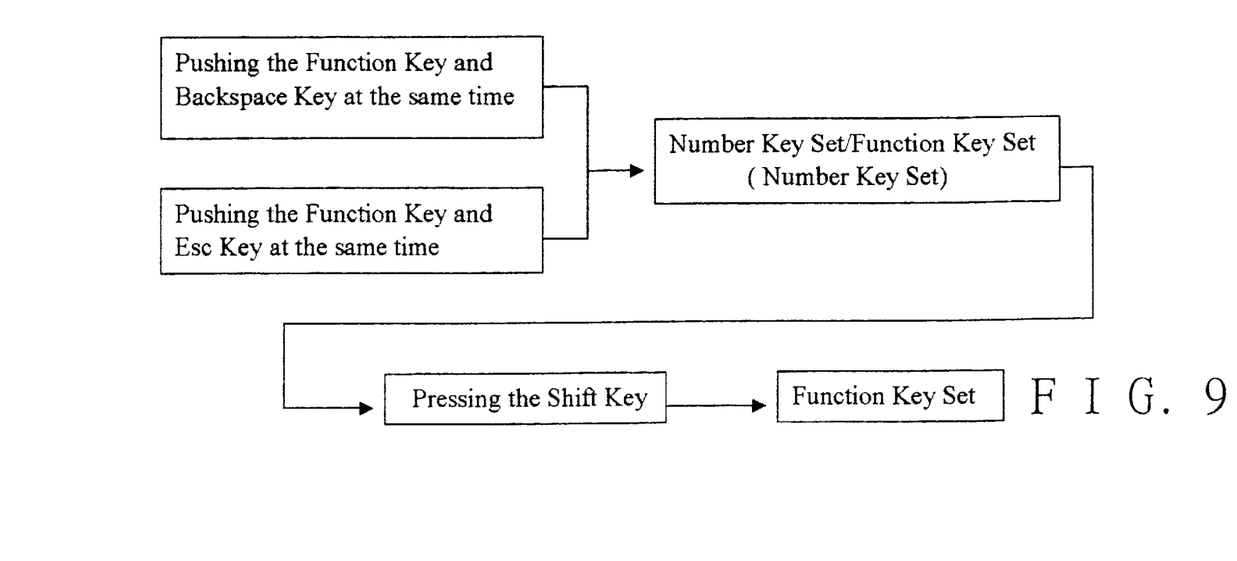
FIG. 9 is a flow chart illustrating switching the numeral key set/function key set of the hand-held computer keyboard.

3. If the Right Stick-like Handle (2) is held, and the Function Key (2423) and the Back Space Key (2451) are pressed, then the function of the Right Stick-like Handle (2) becomes a Number Key Set/Function Key Set. Meanwhile, the function of pressing the Shift Key (2424) is like that of pressing the Number Lock Key on a traditional keyboard. When users press the Shift Key (2424), the Number Key Set/Function Key Set will be operated as a Function Key set, but without pressing it, the Number Key Set/Function Key Set will be operated as a Number Key Set. If the users press the Shift Key (2424) again, then the Number Key Set/Function Key Set will be operated as a Number Key Set. Furthermore, the functions are similar to the above when users hold the Left Stick-Like Handle (1) and then press the Function Key (1423) and the Esc Key (1451) (as shown in FIG. 9).

Figure 10:
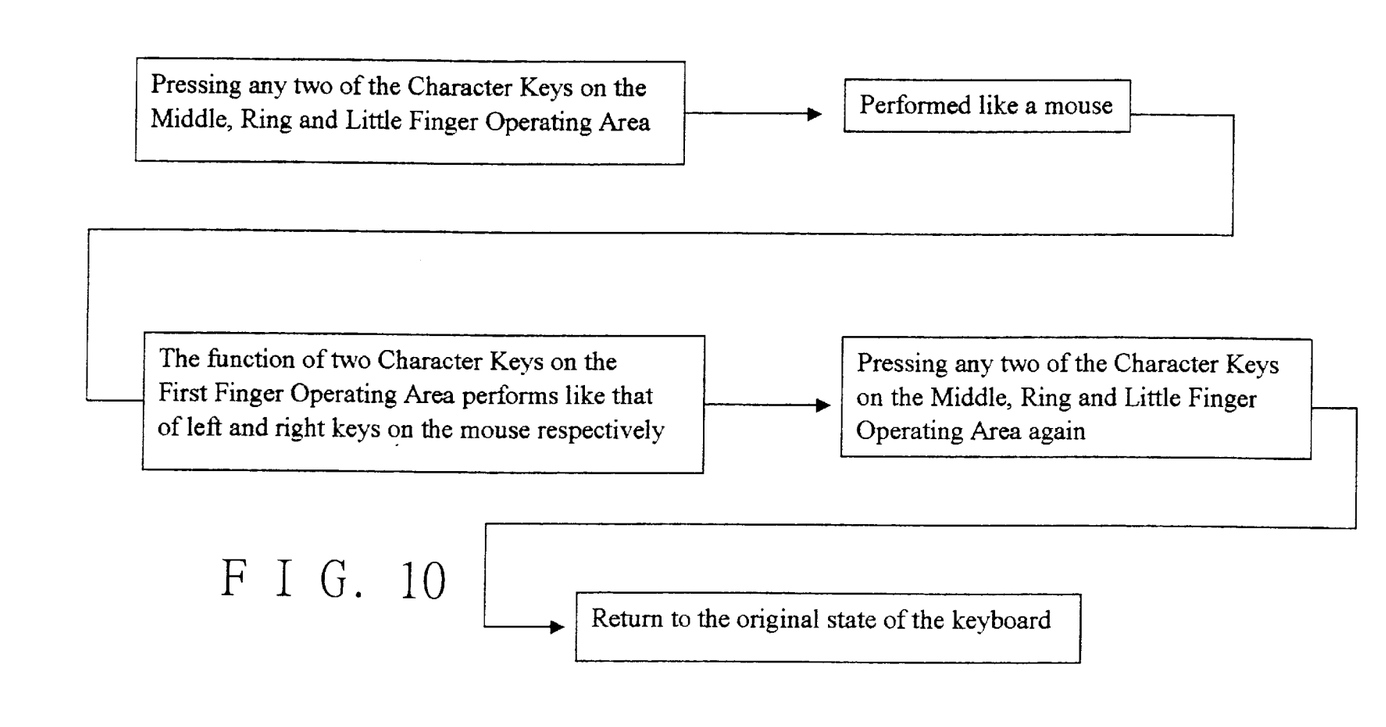
FIG. 10 is a flow chart illustrating switching the keyboard mold/mouse mold of the hand-held computer keyboard.
Figure 12:
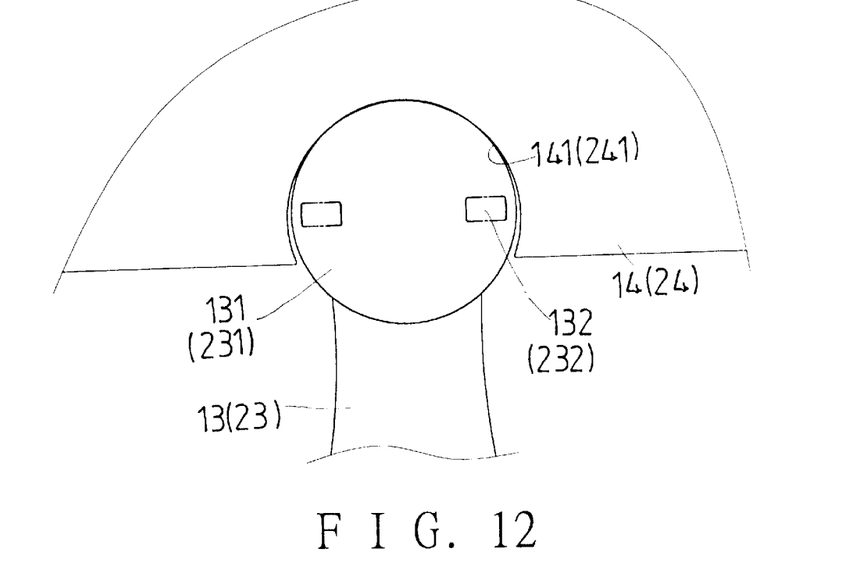

4. The sphere (131), (231) is matched with Hollow (141), (241) on the top of the Handle (13), (23) in the Left and Right Stick-like Handles (131), (231), respectively, to make the Hand-Held Position (14), (24) move freely to the front, back, right and left sides. Based upon this property, users can operate the Left, Right Stick-like Handles (1), (2) like a mouse. FIG. 10 illustrates that if users would like to operate the Left, Right Stick-like Handles (1), (2) like a mouse, they can press any two of the Character Keys (1441), (1442), (1443), (2441), (2442), (2443) on the Middle, Ring and Little Finger Operating Areas (144), (244). Further, this operation stops the two Carts (132), (232) from protruding to grip the Hollow (141), (241) of the Hand-Held Position (14), (24), allowing the Hand-Held Position (14), (24) to move freely to the front, back, right and left sides; this operation performs like a mouse (as shown in FIG. 12). Meanwhile, the function of the Character Keys (1431), (1432) or (2431), (2432) on the First Finger Operating Areas (143), (243) performs like that of the left and right keys on the mouse, respectively. When users press any two of the Character Keys (1441), (1442), (1443), (2441), (2442), (2443) on the Middle, Ring and Little Finger Operating Areas (144), (244), the mouse-like function of the Left, Right Stick-like Handles (1), (2) will be turned off.

5. When users press the Function Keys (1423), (2423), then the Character Keys (1431), (1432), (1441), (1442), (1443), (2431), (2432), (2441), (2442), (2443) will be converted to having the functions of the number/character keys F5, F4, F3, F2, F1, F6, F7, F8, F9, F10, respectively.

6. If users do not press the Function Keys (1423), (2423) and the Choosing Keys (1421), (2421), then the Character Keys (1431), (1432), (1441), (1442), (1443), (2431), (2432), (2441), (2442), (2443) will represent 5, 4, 3, 2, 1, 6, 7, 8, 9 and 0, respectively. If users press the upper Choosing Keys (1421), (2421) only, then the Character Keys (1431), (1432), (1441), (1442), (1443), (2431), (2432), (2441), (2442), (2443) will represent T, R, E, W, Q, Y, U, I, O and P, respectively. If the users press the lower Choosing Keys (1422), (2422), then the Character Keys (1431), (1432), (1441), (1442), (1443), (2431), (2432), (2441), (2442), (2443) will represent G, F, D, S, A, H, J, K and L, respectively. If users press the upper Choosing Keys (1421), (2421) and the lower Choosing Keys (1422), (2422) at the same time, then the Character Keys (1431), (1432), (1441), (1442), (1443), (2431), (2432), (2441), (2441), (2443) will represent B, V, C, X, Z, N, M, ",", and /, respectively (as shown in FIG. 6).

Some examples of how to operate the hand-held computer keyboard are illustrated as follows:

EXAMPLE 1

Typing the Sentence "I have been here since June, 1952.":
Press the Shift Keys (1424), (2424) continuously with the thumb [To key in a capital letter]
- (a) and press the upper Choosing Keys (1421), (2421) and Character Key (2441) on the Middle, Ring and Little Finger Operating Areas (244) in the Right Stick-like Handle (2) [To key in 'I'];
- (b) don't press the Shift Keys (1424), (2424) [to key in small letters];
- (c) and press the Space Key (1461), (2461) on the Palm Operating Areas (146), (246) [To key in an empty character];

(d) and press the lower Choosing Keys (1422), (2422) with the thumb and Character Key (2431) on the First Finger Operating Area (243) in the Right Stick-like Handle (2) [To key in 'h'];

(e) and press the lower Choosing Keys (1422), (2422) with the thumb and Character Key (1443) on the Middle, Ring and Little Finger Operating Areas (144) in the Left Stick-like Handle (1) [To key in 'a'];

(f) and press the lower Choosing Keys (1422), (2422) and upper Choosing Keys (1421), (2421) with the thumb at the same time, then press Character Key (1432) on the First Finger Operating Area (143) in the Left Stick-like Handle (1) [To key in 'b'];

(g) and press the upper Choosing Keys (1421), (2421) and Character Key (1441) on the Middle, Ring and Little Finger Operating Areas (144) in the Left Stick-like Handle (1) [To key in 'e'];

(h) and press the Space Keys (1461), (2461) on the Palm Operating Areas (146), (246) [To key in an empty character];

(i) and press the lower Choosing Keys (1422), (2422) and upper Choosing Keys (1421), (2421) with the thumb at the same time, then press Character Key (1431) on the First Finger Operating Area (143) in the Left Stick-like Handle (1) [To key in 'b'];

(j) and press the upper Choosing Keys (1421), (2421) and Character Key (1441) on the Middle, Ring and Little Finger Operating Areas (144) in the Left Stick-like Handle (1) [To key in 'e'];

(k) and press the upper Choosing Keys (1421), (2421) and Character Key (1441) on the Middle, Ring and Little Finger Operating Areas (144) in the Left Stick-like Handle (1) [To key in 'e'];

(l) and press the lower Choosing Keys (1422), (2422) and upper Choosing Keys (1421), (2421) with the thumb at the same time then press Character Key (2431) on the First Finger Operating Area (243) in the Right Stick-like Handle (2) [To key in 'n'];

(m) and press the Space Keys (1461), (2461) on the Palm Operating Areas (146), (246) [To key in an empty character];

(n) and press the lower Choosing Keys (1422), (2422) with the thumb and Character Keys (2431) on the First Finger Operating Area (243) in the Right Stick-like Handle (2) [To key in 'h'];

(o) and press the upper Choosing Keys (1421), (2421) and Character Key (1441) on the Middle, Ring and Little Finger Operating Areas (144) in the Left Stick-like Handle (1) [To key in 'e'];

(p) and press the lower Choosing Keys (1422), (2422) with the thumb and Character Key (1432) on the First Finger Operating Area (143) in the Left Stick-like Handle (1) [To key in 'r'];

(q) and press the upper Choosing Keys (1421), (2421) and Character Key (1441) on the Middle, Ring and Little Finger Operating Areas (144) in the Left Stick-like Handle (1) [To key in 'e'];

(r) and press the Space Keys (1461), (2461) on the Palm Operating Areas (146), (246) [To key in an empty character];

(s) and press the lower Choosing Keys (1422), (2422) with the thumb and Character Key (1442) on the Middle, Ring and Little Finger Operating Areas (144) in the Left Stick-like Handle (1) [To key in 's'];

(t) and press the upper Choosing Keys (1421), (2421) and Character Key (2441) on the Middle, Ring and Little Finger Operating Areas (244) in the Right Stick-like Handle (2) [To key in 'I'];

(u) and press the lower Choosing Keys (1422), (2422) and the upper Choosing Keys (1421), (2421) with the thumb at the same time, then press Character Key (2431) on the First Finger Operating Area (243) in the Right Stick-like Handle (2) [To key in 'n'];

(v) and press the lower Choosing Keys (1422), (2422) and the upper Choosing Keys (1421), (2421) with the thumb at the same time, then press Character Key (1441) on the First Finger Operating Area (143) in the Left Stick-like Handle (1) [To key in 'c'];

(w) and press the upper Choosing Keys (1421), (2421) and Character Key (1441) on the Middle, Ring and Little Finger Operating Areas (144) in the Left Stick-like Handle (1) [To key in 'e'];

(x) and press the Space Keys (1461), (2461) on the Palm Operating Areas (146), (246) [To key in an empty character];

(y) and press the Shift Keys (1424), (2424) continuously with the thumb [To key in a capital letter];

(z) and press the lower Choosing Keys (1422), (2422) with the thumb and Character Key (2432) on the First Finger Operating Area (243) in the Right Stick-like Handle (2) [To key in 'J'];

(aa) do not press the Shift Keys (1424), (2424) [To key in a small letter];

(bb) and press the upper Choosing Keys (1421), (2421) and Character Key (2432) on the First Finger Operating Area (243) in the Right Stick-like Handle (2) [To key in 'u'];

(cc) and press the lower Choosing Keys (1422), (2422) and the upper Choosing Keys (1421), (2421) with the thumb at the same time then press the Character Key (2431) on the First Finger Operating Area (243) in the Right Stick-like Handle (2) [To key in 'n'];

(dd) and press the upper Choosing Keys (1421), (2421) and Character Key (1441) on the Middle, Ring and Little Finger Operating Area (144) in the Left Stick-like Handle (1) [To key in 'e'];

(ee) and press the lower Choosing Keys (1422), (2422) and the upper Choosing Keys (1421), (2421) with the thumb at the same time, then press Character Key (2441) on the Middle, Ring and Little Finger Operating Areas (244) in the Right Stick-like Handle (2) [To key in ","];

(ff) and press the Character Key (1443) on the Middle, Ring and Little Finger Operating Areas (144) in the Left Stick-like Handle (1) [To key in '1'];

(gg) and press the Character Key (2442) on the Middle, Ring and Little Finger Operating Areas (244) in the Right Stick-like Handle (2) [To key in '9'];

(hh) and press the Character Key (1431) on the First Finger Operating Area (143) in the Left Stick-like Handle (1) [To key in '5'];

(ii) and press the Character Key (1442) on the Middle, Ring and Little Finger Operating Areas (144) in the Left Stick-like Handle (1) [To key in '2'];

(jj) and press the lower Choosing Keys (1422), (2422) and the upper Choosing Keys (1421), (2421) with the thumb at the same time, then press Character Key (2442) on the Middle, Ring and Little Finger Operating Areas (244) in the Right Stick-like Handle (2) [To key in "."]

EXAMPLE 2

Typing the Equation "[1+2]×3=9":

First of all, the operation of the Left Stick-like Handle (1) is taken as an example (as shown in FIG. 7):

(a) Press the function Key (1423) and Esc Key (1451) in the Left Stick-like Handle (1) [To convert the Character Keys (1431), (1432), (1441), (1442), (1443) on the First Finger Operating Area (143) and the Middle, Ring and Little Finger Operating Areas (144) to a Number Key Set/Function Key Set];

(b) and press the upper Choosing Key (1421) and the Character Key (1443) on the Middle, Ring and Little Finger Operating Areas (144) [To key in "["];

(c) and press the lower Choosing Key (1422) and the Character Key (1432) on the First Finger Operating Area (143) [To key in "1"];

(d) and press the Character Key (1431) on the First Finger Operating Area (143) [To key in "+"];

(e) and press the lower Choosing Key (1422) and the Character Key (1441) on the Middle, Ring and Little Finger Operating Areas (144) [To key in "2"];

(f) and press the lower Choosing Key (1422) and Character Key (1443) on the Middle, Ring and Little Finger Operating Areas (144) [To key in "]"];

(g) and press the lower Choosing Key (1422) and the Character Key (1431) on the First Finger Operating Area (143) [To key in "×"];

(h) and press the lower Choosing Key (1422) and the Character Key (1442) on the Middle, Ring and Little Finger Operating Areas (144) [To key in "3"];

(i) and press the upper Choosing Key (1421) and the lower Choosing Key (1422) at the same time and then pressing the Character Key (1432) on the First Finger Operating Area (143) [To key in "="];

(j) and press the Character Key (1442) on the Middle, Ring and Little Finger Operating Areas (144) [To key in "9"];

Secondly, the operation of the Right Stick-like Handle (2) is taken as an example (as shown in FIG. 7):

(k) Press the Function Key (2423) and Back Space Key (2451) in the Right Stick-like Handle (2) [To convert the Character Keys (2431), (2432), (2441), (2442), (2443), on the First Finger Operating Area (243) and the Middle, Ring and Little Finger Operating Areas (244) to a Number Key Set/Function Key Set];

(l) and press the upper Choosing Key (2421) and Character Key (2443) on the Middle, Ring and Little Finger Operating Areas (244) [To key in "["];

(m) and press the lower Choosing Key (2422) and the Character Key (2432) on the First Finger Operating Area (243) [To key in "1"];

(n) and press the Character Key (2431) on the First Finger Operating Area (243) [To key in "+"];

(o) and press the lower Choosing Key (2422) and Character Key (2441) on the Middle, Ring and Little Finger Operating Areas (244) [To key in "2"];

(p) and press the lower Choosing Key (2422) and Character Key (2443) on the Middle, Ring and Little Finger Operating Areas (244) [To key in "]"];

(q) and press the lower Choosing Key (2422) and the Character Key (2431) on the First Finger Operating Area (243) [To key in "×"];

(r) and press the lower Choosing Key (2422) and Character Key (2442) on the Middle, Ring and Little Finger Operating Areas (244) [To key in "3"];

(s) and press the upper Choosing Key (2421) and lower Choosing Key (2422) at the same time and then pressing the Character Key (2432) on the First Finger Operating Area (243) [To key in "="];

(t) and press the Character Key (2442) on the Middle, Ring and Little Finger Operating Area (244) [To key in "9"].

EXAMPLE 3

To insert a character in the string by utilizing the INS function key (as shown in FIGS. 7 and 9):

(a) Press the Function Key (1423) and Esc Key (1451) in the Left Stick-like Handle (1) at the same time [or, Press the Function key (2423) and Back Space Key (2451) in the Right Stick-like Handle (2) at the same time (this step can be omitted under the Number Key Set mode)];

(b) Press the Shift Keys (1424), (2424) [To switch the Number Key Set to the Function Key Set];

(c) and press the lower Choosing Keys (1422), (2422) and the upper Choosing Keys (1421), (2421) with the thumb at the same time, then press Character Keys (1441), (2441) on the Middle, Ring and Little Finger Operating Areas (144), (244) [To utilize the INS function key];

(d) finally, press the desired character to complete the inserting action.

As far as other function keys [like Home, Page Up, Delete, End, Page Down, ↑, ←, ↓, →] are concerned, since the operation method is like that of the INS function key, the procedure is not provided as a separate example.

Based on the three examples listed above, it is obvious that the hand-held computer keyboard is more convenient for users to operate than the traditional keyboard in that utilizing the thumb efficiently can help save time. In addition, it is also very convenient for a left-handed person to operate the number/function key sets since the number/function key sets can be operated by both the right and left hands in the hand-held computer keyboard.

The Choosing Keys on the Thumb Operation Area on the Left or Right Stick-like Handles can be divided into three sections. With the three Choosing Keys, users can key in Z, X, C, V, B, N, M, ",", ".", and "/" without pressing the upper Choosing Key and the lower Choosing Key at the same time. Besides, users can key in more characters because of the six permutations of the three Choosing Keys, such as without pressing the Choosing Key, pressing the upper Choosing Key, pressing the middle Choosing Key, pressing the lower Choosing Key, pressing the upper and middle Choosing Keys, or pressing the middle and lower Choosing Keys. There are ten characters on each character row, and therefore users can key in 60 separate characters.

The hand-held computer keyboard can reduce the F-function keys from twelve (F1, F2, . . . , F12) to ten (F1, F2 . . . , F10) since the F-function keys are used less nowadays. But if the users would like to extend the number of function keys, they can utilize the Shift Key and Function Key to expand the number from ten to twenty.

Further, it is also convenient for tyros or unfamiliar users to operate the system because the layout of keyboard can be shown on the computer monitor.

As can be understood from the above description of the invention, its advantages can be summarized as follows:

1. It is more space efficient than the traditional keyboard;
2. The clamping apparatus can fix the keyboard on any suitable place;

3. Its friendly ergonomics help users to operate the keyboard with each finger easily;
4. It is easy for both left-handed and right-handed users to operate, and it can be operated as a mouse; and,
5. It can accelerate the speed and increase the efficiency of typing by utilizing the user's thumb.

What is claimed is:

1. A hand-held computer keyboard comprising:

a pair of hand-held control members, each of said hand-held control members adapted to be held and operated by a respective hand of a user, each of said hand-held control members having a base plate, a central support rod extending from said base plate, and a main operating member coupled to said central support rod for pivotal displacement thereabout during operation, said base plate having a clamping member removably affixing said base plate to a support surface, said central support rod having an upper engaging surface formed thereon, said upper engaging surface having a pair of retractable engaging members projecting therefrom, said upper engaging surface being received within a recess formed in said main operating member, said recess defining a contact surface, said retractable engaging members being displaceable between extended and retracted positions, said retractable engaging members in said extended position engaging said contact surface to limit rotation of said main operating member about said central support rod, said rotation of said main operating member about said central support rod generating pointer control signals to a computer system, said main operating member having an upper surface and a plurality of user actuatable keys projecting therefrom.

* * * * *